United States Patent
Hvittfeldt et al.

(10) Patent No.: US 6,577,093 B1
(45) Date of Patent: Jun. 10, 2003

(54) MANIPULATOR

(75) Inventors: Hakan Hvittfeldt, Västerås (SE); Jan Larsson, Västerås (SE); Pierre Mikaelsson, Västerås (SE); Fredik Persson, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/831,741

(22) PCT Filed: Nov. 9, 1999

(86) PCT No.: PCT/SE99/02028

§ 371 (c)(1),
(2), (4) Date: Jun. 25, 2001

(87) PCT Pub. No.: WO00/29177

PCT Pub. Date: May 25, 2000

(30) Foreign Application Priority Data

Nov. 12, 1998 (SE) .................................................. 9803896

(51) Int. Cl.$^7$ .............................. B25J 9/18; G05B 19/19

(52) U.S. Cl. ................................................... 318/568.11
(58) Field of Search ............................ 318/568.11, 560

(56) References Cited

U.S. PATENT DOCUMENTS 4,716,785 A    1/1988  Godai et al.
4,976,582 A   12/1990  Clavel

FOREIGN PATENT DOCUMENTS

EP    0 203 202    12/1986
EP    0 245 530    11/1987

*Primary Examiner*—Jeffrey Donels
(74) *Attorney, Agent, or Firm*—Dykema Gossett PLLC

(57) ABSTRACT

A manipulator for an environment with hygienic requirements, comprising a stationary element (1) with a plurality of drive means (2), and arms (3) attached to the drive means, which arms, via a respective linkage (4), support a movable element (5). The drive means (2) are enclosed in an enclosure (6) which encloses a gaseous coolant which, by a forced flow, takes up heat from the motors of the drive means.

8 Claims, 1 Drawing Sheet

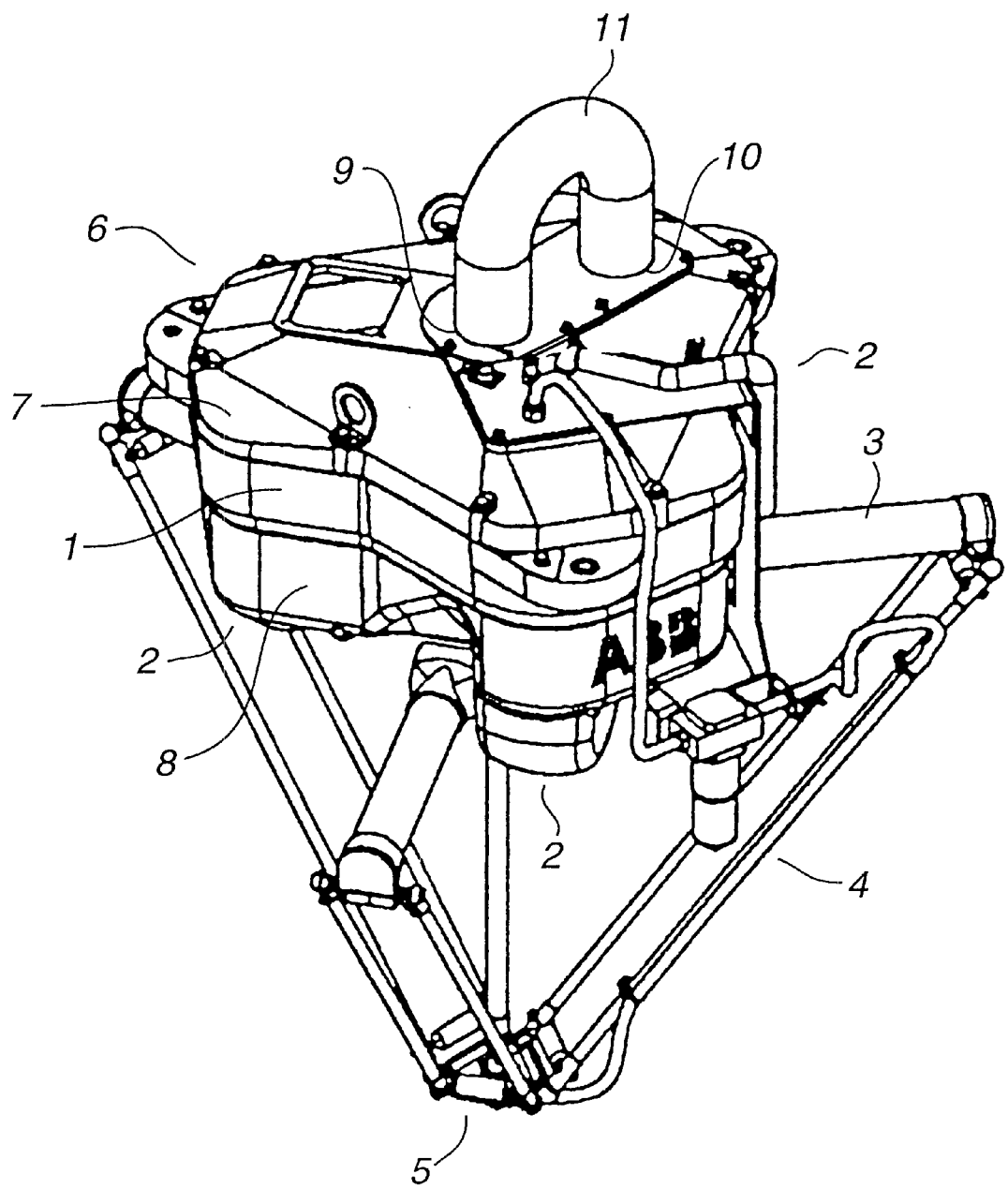

MANIPULATOR

TECHNICAL FIELD

The invention relates to a manipulator which, with the assistance of a control unit, forms an industrial robot for primarily picking purposes. In particular, the invention relates to a manipulator with three arms by means of which a movable member, comprised in the manipulator, is brought to arbitrary positions in space with retained orientation and inclination.

BACKGROUND ART

An industrial robot comprises a manipulator and control equipment, whereby the manipulator with the assistance of the control equipment carries out arbitrary operations within a working range. Usually, such a manipulator comprises a plurality of arms which support a hand, on which a tool is arranged. In the majority of robot applications, a traditional six-axis manipulator is used, which exhibits sufficient movability to carry out a wide range of operations with mostly very high accuracy. For certain applications, however, there is a need of a manipulator which has fewer degrees of freedom but which permits faster operations. Such a manipulator may be mechanically connected in such a way that the tool-carrying hand is all the time oriented in space in a predetermined manner.

From U.S. Pat. No. 4,976,582 a manipulator is previously known by means of which a movable element in relation to a stationary element may be moved in a space with retained orientation and retained inclination. The manipulator has three arms which jointly support the movable element. Each of these arms is rotatably journalled in the stationary element around a respective first axis. The arm supports a linkage, one end of which is rotatably journalled in the outer part of the arm, allowing a movement in two degrees of freedom. In its other end, the linkage supports the movable element and is journalled therein, allowing a movement in two degrees of freedom.

The linkage comprises two parallel links and is arranged, together with the arm, such that one of the degrees of freedom of each end of the linkage constitutes a rotation around an axis which is parallel to the first axis of the respective arm. Irrespective of the movements of the arm or the linkage, these three axes of rotation are thus kept in parallel. In this way, the movable element will always have the same orientation and inclination in relation to the stationary element. One condition, however, is that the respective first axes of the arms form an angle with each other.

When working in spaces where there are hygienic requirements, a manipulator may not emit any smell, fluid or dirt which may cause sanitary inconvenience in this space. Activities in such spaces often give off dirt and fluids which accumulate on the manipulator and which are then emitted therefrom. The known manipulator has an open design with a plurality of components. All movable components including the drive means with their motors must be lubricated. In that context, it is unavoidable that lubricant and accumulated dirt are, at some time, emitted from the manipulator. This makes the known manipulator less suitable for use in spaces where hygienic requirements are made.

SUMMARY OF THE INVENTION

The object of the present invention is to suggest ways and means of manufacturing a manipulator of the kind described above, which is arranged such that it may be used in spaces with hygienic requirements. The manipulator shall be prevented from giving off smell, fluid or dirt. The manipulator shall be capable of being flushed and still capable of diverting heat given off by the drive means. During start-up of the manipulator in a cold space, the drive means shall be capable of being preheated.

These objects are achieved according to the invention by a manipulator according to the characteristic features described in the characterizing portion of the independent claim 1 and with a method according to the characteristic features described in the characterizing portions of the independent claims 6 and 9. Advantageous embodiments are described in the characterizing portions of the dependent claims.

According to the invention, the above-mentioned objects are achieved by arranging an enclosure forming a closed system surrounding the drive means of the manipulator. Within this enclosure, a coolant, which may be air, is pressed through the motors of the drive means. The coolant then delivers the absorbed heat to an external cooling system. During cold start of the manipulator, heat is instead supplied to the motors via the coolant.

The enclosure is closed with such a tightness that it is capable of being flushed without liquid penetrating into the enclosure and there causing damage to the manipulator. The whole manipulator including the enclosure is formed with smooth surfaces without folds or pockets which may attract dirt. Dirt or liquid, given off from the motors, is collected within the enclosure.

BRIEF DESCRIPTION OF THE DRAWING

The invention will be explained in greater detail by description of an embodiment with reference to the accompanying drawing showing a three-dimensional view of a manipulator according to the invention, in which the drive means are enclosed in an enclosure.

DESCRIPTION OF THE PREFERRED EMBODIMENT

The manipulator shown in the FIGURE comprises a stationary element 1, to which three drive means 2 (concealed) are attached. To each drive means there is attached an arm 3 which, via a linkage 4, supports a movable element 5. The three arms with their linkages are identical in the example, and therefore only one of the three arms has been provided with reference numeral. The three drive means are enclosed within an enclosure 6 which has a lower section 7 and an upper section 8. The lower section is arranged such that liquid and dirt, possibly emitted from the drive means and their motors, are collected inside the enclosure.

Inside the enclosure, a coolant circulates, in the example shown consisting of gas, for example air. The upper section 7 comprises an outlet for supply air 9 and an outlet for exhaust air 10. In the example shown, exhaust air and supply air are interconnected by an external duct 11. This results in a closed cooling system for the drive means and their motors. A fan (not shown) presses air through the motors inside the enclosure. The air absorbs heat from the motors and circulates it further through the external duct. The external duct is adapted to comprise a cooling device (not shown). Such a cooling device may be a heat exchanger which is traversed by an outer coolant, which may be a liquid. The air passing through the duct then gives off its absorbed heat to the outer coolant. There is nothing preventing arranging the ventilation in the enclosure into a larger system common to several manipulators. However, such a ventilation system should be closed in relation to the space where the manipulator is working.

By enclosing the drive means of the manipulator, in this way, in an enclosure which is tight relative to the space where the manipulator is working, the manipulator may be used for operations in environments involving high hygienic requirements. In an advantageous embodiment, the enclosure is capable of being flushed, so that it may easily be cleaned without liquid penetrating into the enclosure and there causing damage to the manipulator. A tight enclosure implies that the motors of the drive means must be supplied with a cooling effect during operation. Otherwise, the motors get overheated, ultimately resulting in breakdown. The forced cooling described above is thus necessary in case of a completely tight enclosure.

By arranging a heat exchanger in the cooling duct, the air circulating inside the enclosure may be rapidly cooled. This makes it possible to keep the motors at a correct working temperature, regardless of the load. The heat exchanger and the forced cooling may also advantageously be used for putting the manipulator into operation. In certain cases, the manipulator is placed in a cold space. During an interruption, for example overnight, the whole manipulator including the motors become cooled. At a lower temperature, lubricant is viscous and does not have the same lubricating ability as at warmer temperatures. The cooled manipulator must then be started with slow movements such that the lubrication is ensured. According as the motors give off heat, the lubricant is heated and the speed of the manipulator may increase. During such cold starts, the cooling system may instead, somewhat before the putting into operation, supply the motors with hot air which is heated via the heat exchanger. In this way, the manipulator may be started with full performance even during start-up.

What is claimed is:

1. A manipulator for an environment with hygienic requirements, comprising a stationary element with a plurality of drive means, and arms attached to the drive means, said arms, via a respective linkage, supporting a movable element, the manipulator further comprising an enclosure forming a closed cooling system containing gaseous coolant and surrounding the drive means, the coolant taking up heat from the motors of the drive means by a forced flow.

2. A manipulator according to claim 1, wherein the enclosure is sealed over the drive means for collecting fluid and dirt from the drive means.

3. A manipulator according to claim 1, wherein the coolant comprises air which, by the force from a fan, passes through the motors of the drive means.

4. A manipulator according to claim 1, wherein means are provided to permit the coolant to circulate through a heat exchanger which transfers heat from the coolant to an outer coolant.

5. A method for manufacturing a manipulator for an environment with hygienic requirements, including a stationary element with a plurality of drive means, and arms attached to the drive means, said arms, via a respective linkage, supporting a movable element, comprising the steps of surrounding the drive means by an enclosure which forms a closed cooling system, filling the enclosure with a gaseous coolant, and using the coolant to take up heat from the motors of the drive means by a forced flow.

6. A method for manufacturing a manipulator according to claim 5, comprising the further step of using the enclosure to collect fluid and dirt from the drive means, the coolant comprising air which is pressed by a fan through the motors of the drive means.

7. A method for manufacturing a manipulator according to claim 6, comprising the step of circulating the coolant through a heat exchange where heat from the coolant is transferred to an outer coolant.

8. A method for putting into operation a manipulator for an environment with hygienic requirements including a stationary element with a plurality of drive means and arms attached to the drive means, said arms, via respective linkages, supporting a movable element, comprising the steps of surrounding the drive means to by an enclosure forming a closed cooling system, filling the enclosure with a gaseous coolant, and using the coolant, before the manipulator is started, to give off heat to the motors of the drive means by a forced flow.

* * * * *